Patented Feb. 1, 1927.

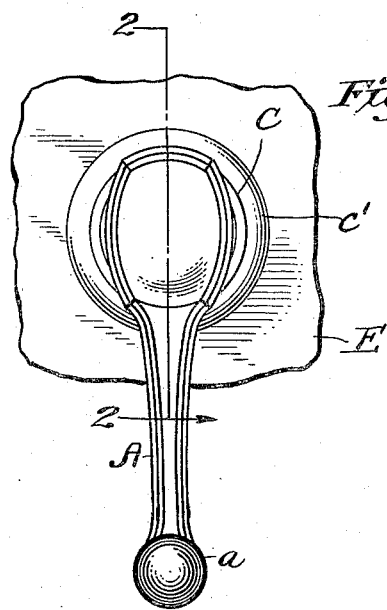
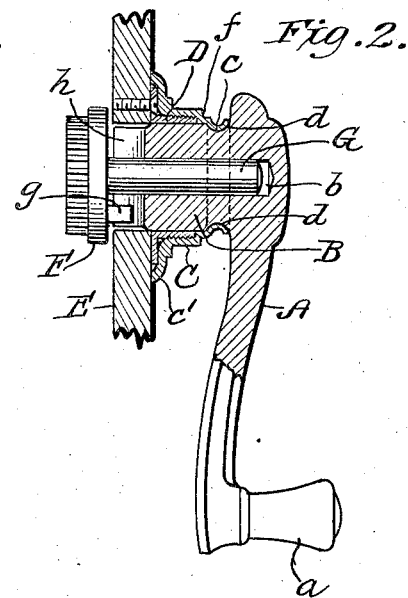
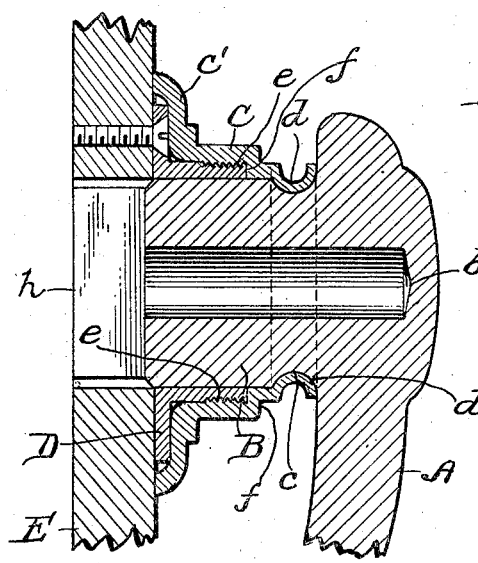

1,615,851

UNITED STATES PATENT OFFICE.

LOUIS ROTH, OF ELIZABETH, NEW JERSEY, ASSIGNOR TO STERLING BRONZE COMPANY, OF NEW YORK, N. Y., A CORPORATION OF NEW YORK.

OPERATING MEANS FOR SASH ADJUSTERS.

Application filed March 3, 1924. Serial No. 696,425.

This invention is an operating device for imparting movement to a sash raising and lowering mechanism used on motor cars of the closed body type.

In this class of devices it is desirable that the operating handle for imparting movement to the mechanism shall be capable of easy and quick assemblage with respect to the prime moving element and that there shall be no parts which will become loosened by the jar or vibration of the motor vehicle.

The object of my invention is to attain the foregoing advantages by a simple construction which is economical of manufacture, and to these ends the invention embodies an operating member the surface of which is unbroken and which member is provided with a hub in the exterior face of which is an annular groove, the latter being occupied by a rib that is compressed into said groove so as to turn freely thereon, said rib being unitary with a sleeve the function of which is to retain the operating member in the required normal operative relation to the prime moving element of the sash adjusting mechanism.

Other functions and advantages of the invention will appear from the following description taken in connection with the accompanying drawings, wherein—

Figure 1 is an elevation of my operating member in position within a car body.

Figure 2 is a vertical section of the operating member in assembled relation to one type of sash-operating mechanism.

Figure 3 is an enlarged section on the line 2—2 of Figure 1.

A is the operating member herein shown as a crank handle of any suitable design and provided with a finger knob, $a$. Said member is provided with a hub B which is bored axially to produce a longitudinal socket $b$, and adjacent to the end portion of the crank A this hub B is provided in its outer surface with an annular groove $c$.

C is a retaining member shown herein as a sleeve which is enlarged and formed at one end to produce a face plate $c'$, said sleeve fitting loosely around the grooved part $c$ of said hub B for encasing the same. An essential feature of this sleeve C is a compressed part adjacent the end of said sleeve and which compressed part produces an inwardly extending rib $d$ that occupies the annular groove $c$ of the hub, said rib $d$ and the groove $c$ constituting a swiveled connection between the sleeve C and hub B, whereby the hub and the crank may be rotated relatively to the sleeve C and said sleeve may be fixedly mounted with respect to the crank and its hub.

D is a bushing which is attached fixedly on a door E or other part of the vehicle body, said bushing affording a bearing for the hub B which is fitted loosely therein and is free to rotate with respect thereto. Said bushing is provided with a male thread, and the sleeve C is provided with a female thread $e$, whereby the sleeve may be screwed upon the bushing until its face plate $c'$ is in abutting contact with the face of the door E. The sleeve C encases that part of the bushing which protrudes from the door, and it is preferred to reduce that part of the sleeve adjacent the end of the bushing so as to result in the formation of a shoulder $f$, whereby the sleeve encases certain parts of the hub and the bushing and said sleeve thus provides a desirable fitting for the operating mechanism so as to impart a neat finish for the mounting on the door E.

The sash raising and lowering mechanism may be of any desired type, but in the example shown it includes a rotatable part F having a lug $g$ with which coacts a notched end $h$ of the hub B, whereby said hub may be inserted into the bushing for the notched end $h$ thereof to so engage with the lug $g$ as to couple the hub B to the part F for conjoint rotative movement when the crank A is turned by hand. As further shown, the operating mechanism includes, also, a post G which is loosely received within the axial bore or socket $b$ of the hub.

The operating crank A presents an unbroken and continuous exterior surface which attains a desirable appearance when mounted in position within an automobile body, there being no screw holes or perforations to mar the surface of the crank. The sleeve C and crank A are assembled at the factory prior to installation on the car body, and in the course of such assemblage the sleeve is slipped over the hub and an end portion of the sleeve is turned or compressed to produce the rib which fits snugly within the annular groove to attain the desirable swiveled joint that permanently connects the sleeve to the hub and insures the free rotative movement of said hub within the sleeve. The sash adjusting mechanism including the rotatable member F, post G and bushing D having been installed on or applied to the door, the operation of mounting the crank A and sleeve C is performed easily and quickly, it being necessary only to slip the hub B over the post G and into the bushing D, and to screw the sleeve C upon the bushing until the face plate c' is in abutting contact with the door. The insertion of the hub B within the bushing brings the notched end of said hub into coupled engagement with the rotatable part G so that the rotation of the crank A and hub B imparts rotative movement to the part G for operating the sash raising and lowering mechanism in an obvious manner.

It will be noted that the sleeve C is screwed upon the bushing D and is in abutting contact with the door, whereby the sleeve occupies a stationary relation to the hub and the crank, for retaining the hub and crank in the required coupled engagement with the rotatable part G, but the hub is free to rotate within the sleeve and the bushing for the reason that the grooved part of said hub turns easily within the ribbed part of the sleeve.

The sleeve C and crank A present a neat appearance on the inside of the car, said parts are easily assembled, there are no parts such as screws and nuts to work loose by the jarring of the vehicle, and the mounting cannot readily be tampered with and dis-assembled. Furthermore, all parts are simple in construction, economical of manufacture, and readily produced by unskilled labor.

Having thus fully described the invention, what I claim as new and desire to secure by Letters Patent is:

1. In a device of the class described, a bushing adapted for fixed attachment in an operative position, an operating member provided with an externally grooved hub, said hub extending for a part of its length through said bushing for free rotative movement therein, and said hub having means whereby it may impart movement to a part to be operated, and a sleeve encasing said bushing and attached fixedly thereto, said sleeve being provided adjacent its free end with an internal rib positioned to occupy the external groove of said hub whereby the sleeve retains the hub against sliding movement relative to the bushing.

2. In a device of the class described, a bushing adapted for fixed attachment in an operative position, an operating member provided with a hub, said bushing affording a bearing for said hub, and a sleeve attached fixedly to said bushing, said sleeve and the hub being operatively connected for free rotation one to the other at a point exteriorly to the bushing, whereby the hub is adapted to be rotated with respect to the bushing and the sleeve, and said hub is retained against endwise movement by the operative connection with said sleeve.

In testimony whereof I have hereto signed my name this 27 day of February, 1924.

LOUIS ROTH.